United States Patent [19]
Orriss et al.

[11] Patent Number: 5,572,579
[45] Date of Patent: Nov. 5, 1996

[54] SYSTEM AND METHOD FOR PROVIDING PORTABLE TELEPHONE NUMBER SERVICE

[75] Inventors: Richard A. Orriss, Colts Neck; Margaret K. Balazs, Bridgewater; Laura L. T. Castrovinci, Pittstown; Kathleen D. Cebulka, Washington; Yea-Cheiung E. Chen, Edison, all of N.J.; Neal N. Crystal, Brooklyn, N.Y.; Kelly J. Gaylord, Washington; George W. Hartley, Somerville, both of N.J.

[73] Assignee: Bell Communications Research, Inc., Morristown, N.J.

[21] Appl. No.: 417,542

[22] Filed: Apr. 6, 1995

[51] Int. Cl.$^6$ .................... H04M 15/00; H04M 15/06; H04M 3/42; H04M 7/00
[52] U.S. Cl. .................... 379/142; 379/111; 379/112; 379/115; 379/207; 379/211; 379/216; 379/220; 379/229; 379/230
[58] Field of Search .................... 379/58, 59, 142, 379/207, 211, 216, 220, 221, 229, 230, 111, 112, 115

[56] References Cited

U.S. PATENT DOCUMENTS

| | | | |
|---|---|---|---|
| 4,313,035 | 1/1982 | Jordan | 379/211 |
| 5,008,929 | 4/1991 | Olsen | 379/112 |
| 5,251,248 | 10/1993 | Tokunaga | 379/58 |
| 5,282,244 | 1/1994 | Fuller | 379/207 |
| 5,315,636 | 5/1994 | Patel | 379/59 |
| 5,353,331 | 10/1994 | Emery | 379/58 |

*Primary Examiner*—Wellington Chin
*Assistant Examiner*—Vijay Shankar
*Attorney, Agent, or Firm*—Joseph Giordano

[57] ABSTRACT

In an Advanced Intelligent Telephone Network system, switching points are programmed to trigger a query to a Service Control Point ("SCP") in response to a dialed "500" number. The SCP performs a data request of an outside database storing service provider information, obtaining a service provider identification or a routing number corresponding to the dialed "500" number. The SCP then transmits a switching instruction to the service system point to route the call to the appropriate destination number.

13 Claims, 13 Drawing Sheets

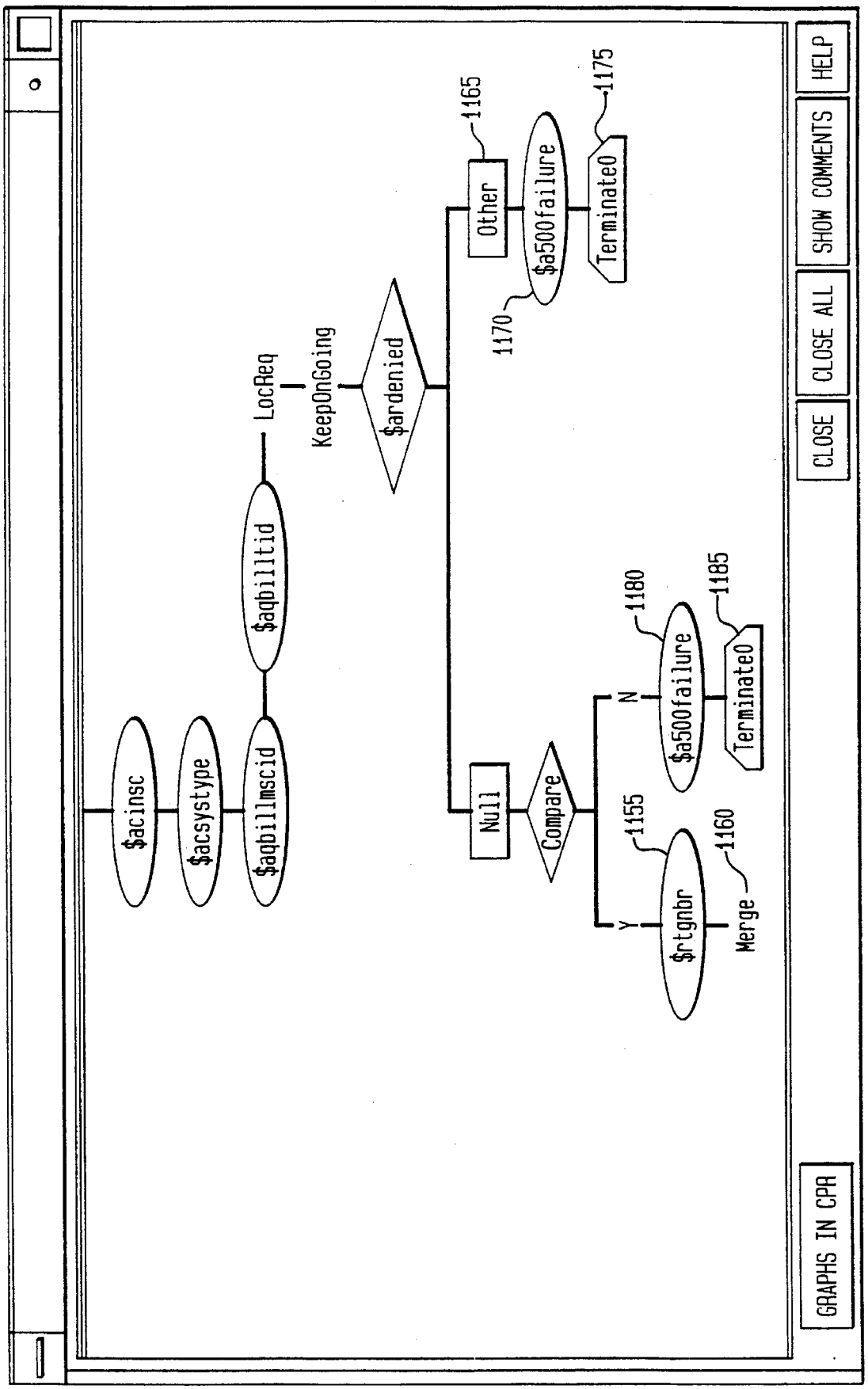

SYSTEM AND METHOD FOR PROVIDING PORTABLE TELEPHONE NUMBER SERVICE

CROSS-REFERENCE TO RELATED APPLICATIONS

This application is related to U.S. patent application Ser. No. 07/934,240, entitled "SYSTEM AND METHOD FOR CREATING, TRANSFERRING, AND MONITORING SERVICES IN A TELECOMMUNICATION SYSTEM," filed Aug. 25, 1992, by Zaher A. Nazif et al. ("the '240 application"); U.S. patent application Ser. No. 07/972,529, entitled "SYSTEM AND METHOD FOR CREATING, TRANSFERRING, AND MONITORING SERVICES IN A TELECOMMUNICATION SYSTEM," filed Nov. 6, 1992, by Zaher A. Nazif et al. ("the '529 application"); U.S. patent application Ser. No. 07/972,817, entitled "A METHOD OF CREATING A TELECOMMUNICATION SERVICE SPECIFICATION," filed Nov. 6, 1992, by Susan K. K. Man et al. ("the '817 application"); and U.S. patent application Ser. No. 08/334,120, entitled "A NETWORK-BASED TELEPHONE SYSTEM PROVIDING COORDINATED VOICE AND DATA DELIVERY," filed Nov. 4, 1994, by Hollenbach et al. ("the '120 application"). The contents of these applications are relied upon and incorporated by reference.

BACKGROUND OF THE INVENTION

The present invention relates generally to the field of telecommunications services, and more particularly to a telephone service provided within a telecommunications network.

The incorporated patent applications describe a system and method for creating and executing customized telecommunication services tailored to subscribers' needs. The system of the incorporated patent applications includes a service creation environment for creating customized telephone services and a service execution environment for executing the telephone services. The service creation environment includes a graphical user interface which permits an operator to build a displayed graphical representation of a desired service using "nodes," "decision boxes," and "branches." Each node represents a high level instruction for the execution of the service. The displayed graphical representation of the service is translated to a binary representation and stored as a call processing record (CPR). CPRs are transmitted from a creation environment to an execution environment where they are executed during call processing operations to return call processing instructions to querying telephone switches.

The system and method for creating and executing customized telephone services described in the incorporated patent applications are described as being implemented in the Advanced Intelligent Telephone Network (AIN). FIG. 1A illustrates a general overview of the AIN.

The AIN may comprise System Service Points (SSPs) 10 and 20, a Signal Transfer Point (STP) 30, a Service Control Point (SCP) 40, Service Management Systems (SMS) 50, and a Data and Reports System (DRS) 60. The SSPs may also be linked to a Cellular Mobility Service Controller (MSC) 15, providing communications with, for example, mobile cellular telephone 17. SMS 60 provides a support interface through which customer data and service logic can be added or managed. DRS 60 further provides network data generated by various components.

SSPs are programmable central office switching systems which receive telephone calls from subscriber telephones 5. Each SSP recognizes a variety of "triggers" from customer telephone call signals and generates queries to the SCP based on the triggers. SSPs may be programmed to recognize a number of different triggers indicating that a call is an AIN-type call. For example, the trigger may relate to the particular called number, even the area code of that number, or the particular service access code (SAC) such as "500."

The SSPs communicate with the local area STP 30 over a Common-Channel-Signalling (CCS) data network 64. CCS network 64 employs data communication channels separate from those channels used to transmit customer voice signals. STP 30 is linked to SCP 40 over a CCS packet-switched network 68. The CCS network switches data in packets instead of allocating circuits for the duration of a call. STP 30 provides the packet-switching functions. Although a direct link from STP 30 to SCP 40 is shown in FIG. 1A, further hiarchial levels of networked STPs are often provided.

Once a query has been launched to the SCP, CPRs residing within the SCP define how a telephone call received by an SSP should be processed for a particular customer. A Multi-Services Application Platform (MSAP) (not shown) residing within the SCP accesses the appropriate CPR based on a "key" associated with the call. MSAP processes the nodes of the CPR and issues corresponding call processing instructions back to the SSP. The SSPs then process customer calls in response to these commands.

As shown in FIG. 1B, the addition of a Home Location Register (HLR) 80 connected to the STP via a CCS network connection 85, provides communication between the SCP 40 and the HLR 80. The HLR maintains mobile customer location information as is well-known in the art.

The SCP may issue commands to the HLR via the STP by employing standard IS-41 protocol. The IS-41 protocol was developed by the cellular telecommunications industry to manage cell-to-cell and system-wide communications. MSC 15 is also connected to SSP 20 via a voice telephone trunk, and SSP 20 is similarly connected to SSP 10. Of course the SSPs and MSC shown in FIG. 1A are in turn connected to other SSPs and MSCs in the telephone network.

As is further shown in FIG. 1B, a Line Identification Database (LIDB) 70, which is well-known in the art, is connected to the STP via data link 75. This connection provides communication between the SCP 40 and LIDB 70.

The incorporated patent applications also disclose how MSAP may access data from the LIDB using "GetData" requests embodied in a CPR. MSAP has transparent, real-time access to information stored in external databases accessible through LIDB 70. GetData requests are source-independent; that is, the request for information is made without knowledge of the source of the information.

The above-described telephone network may provide telephone service to customers in a particular region and is itself connected to other, similar telephone networks. FIG. 2 provides an overview of how regional networks may be interconnected.

SCPs 100, 110, and 120 may represent state or regional SCPs. In other words, each of the STPs 130 may provide communications to the customers of a particular state or region. Note that, as shown by the STPs in FIG. 2, the STP 30 depicted in FIG. 1A may actually constitute a larger network of more than one STP. Thus STP 30 of FIG. 1A may actually comprise STPs 130 and 140 shown in FIG. 2.

As is well known, telephone networks respond to standardized telephone number formats. A standard telephone number includes an area code such as "202," an exchange such as "555," and a local number such as "1212." Separate regions are designated by different area codes.

When a subscriber relocates from a region covered by one area code to another, callers attempting to contact that subscriber must necessarily use a different area code and telephone number. This presents obvious inconveniences and difficulties in tracking and announcing changes in telephone numbers. Certain advantages would be gained by obtaining a single number that does not vary with geographic location or telephone service provider. In an effort to provide those advantages, companies have developed what is known as "500" number service.

Under existing systems and recent proposals, the SAC 500 has been set aside for use with geographic-independent telephone services. The 500 SAC triggers appropriately programmed SSPs to query an SCP. The query may include, for example, the exchange of the dialed 500 number. MSAP locally stores a look-up table listing the service providers corresponding to particular exchanges. A CPR is executed by MSAP to determine, through use of the look-up table, which service provider is associated with the dialed exchange. MSAP responds to the query by instructing the SSP to route the call to the identified service provider. The service provider may then perform further number translations to route the call to its final destination. This type of service is commonly known as "subscriber translation."

It is important to note, however, that the translation systems described above rely upon information residing with specific service providers or SCPs. As a result, such systems suffer from distinct disadvantages, particularly in establishing and terminating services.

For example, currently, establishing a basic 500 number service for a particular subscriber requires the modification of look-up table databases on each SCP within a desired service region. If a subscriber desires to switch service providers and maintain the same 500 number, all of the associated SCPs must be modified to release the particular 500 number for use by the new provider. Only at that point can the new provider begin to initiate service by further modifying pertinent SCPs to reflect a new routing criteria. Even then, the modified SCPs are still only able to direct a call to a particular service provider, which must then make further number translations before a call reaches its intended destination.

In other words, in today's 500 number proposals, the 500 numbers must be assigned to particular service providers for the system to function. Thus, for example, 500 numbers with the exchange "525" might be assigned to AT&T who would provide service for the 10,000 possible telephone numbers associated with that exchange. If more than 10,000 telephone numbers are needed, then AT&T must acquire another 500 exchange. Therefore, service providers and 500 numbers cannot be chosen independently. While this is a simplified illustration of the problems involved in service creation and termination, it serves to demonstrate at least some of the overall complexities and disadvantages of the current and recently proposed systems.

DESCRIPTION OF THE INVENTION

Accordingly, the present invention is directed to a new system and method for providing 500 number telephone services that substantially obviates one or more of the problems due to the limitations and disadvantages of the prior art.

The present invention provides a quick and efficient method of establishing services.

The present invention also provides a new system and method which allows easy and efficient transfers of services from one service provider to another.

Further, the present invention provides complete portability in such a new system and method, allowing separate 500 number and service provider selection.

Additional features and advantages of the invention will be set forth in the description which follows, and in part will be apparent from the description, or may be learned by practice of the invention. The objectives and other advantages of the invention will be realized and attained by means of the instrumentalities and combinations which are particularly pointed out in the written description and appended claims hereof, as well as the appended drawings.

To achieve these and other advantages, and in accordance with the purpose of the invention, as embodied and broadly described herein, the present invention provides a method of controlling a telephone switching network including a control processor connected to a storage device storing data, an originating switching system, a destination switching system, a location register at a Global Title Translation address, and a plurality of telephones in communication with the originating and destination switching systems, each telephone having a corresponding telephone number and calling a called telephone number, the method comprising the steps, executed by the control processor, of receiving from the originating switching system a switching query including a called number; sending the storage device a data query including the called number; receiving from the storage device a data response, including at least an identification of the destination switching system, the Global Title Translation address of the location register, or a routing number associated with the called number; and sending the originating switching system a switching response, including the identification of a destination switching system or the routing number associated with the called number.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

In the drawings:

FIGS. 10–12 are computer screen print-outs of a call processing record implementing subprocessing routines of the preferred embodiment of the present invention.

BEST MODE FOR CARRYING OUT THE INVENTION

Reference will now be made in detail to the construction and operation of preferred implementations of the present invention which are illustrated in the accompanying drawings. The following description of the preferred implementations of the present invention is only exemplary of the invention. The present invention is not limited to these implementations, but may be realized by other implementations.

Figure 1A:
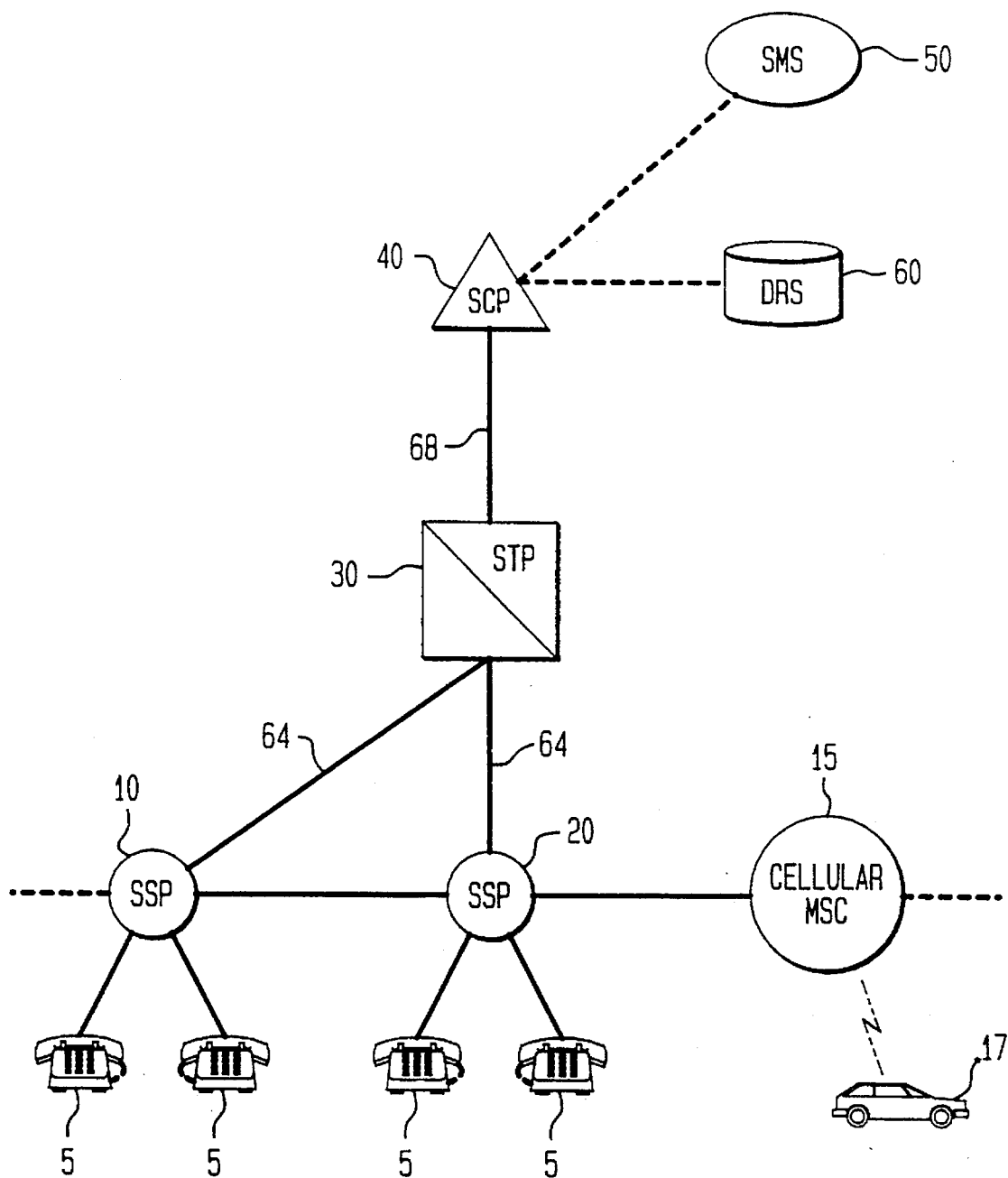
FIG. 1A is a block diagram of the Advanced Intelligent Telephone Network (AIN)
Figure 1B:
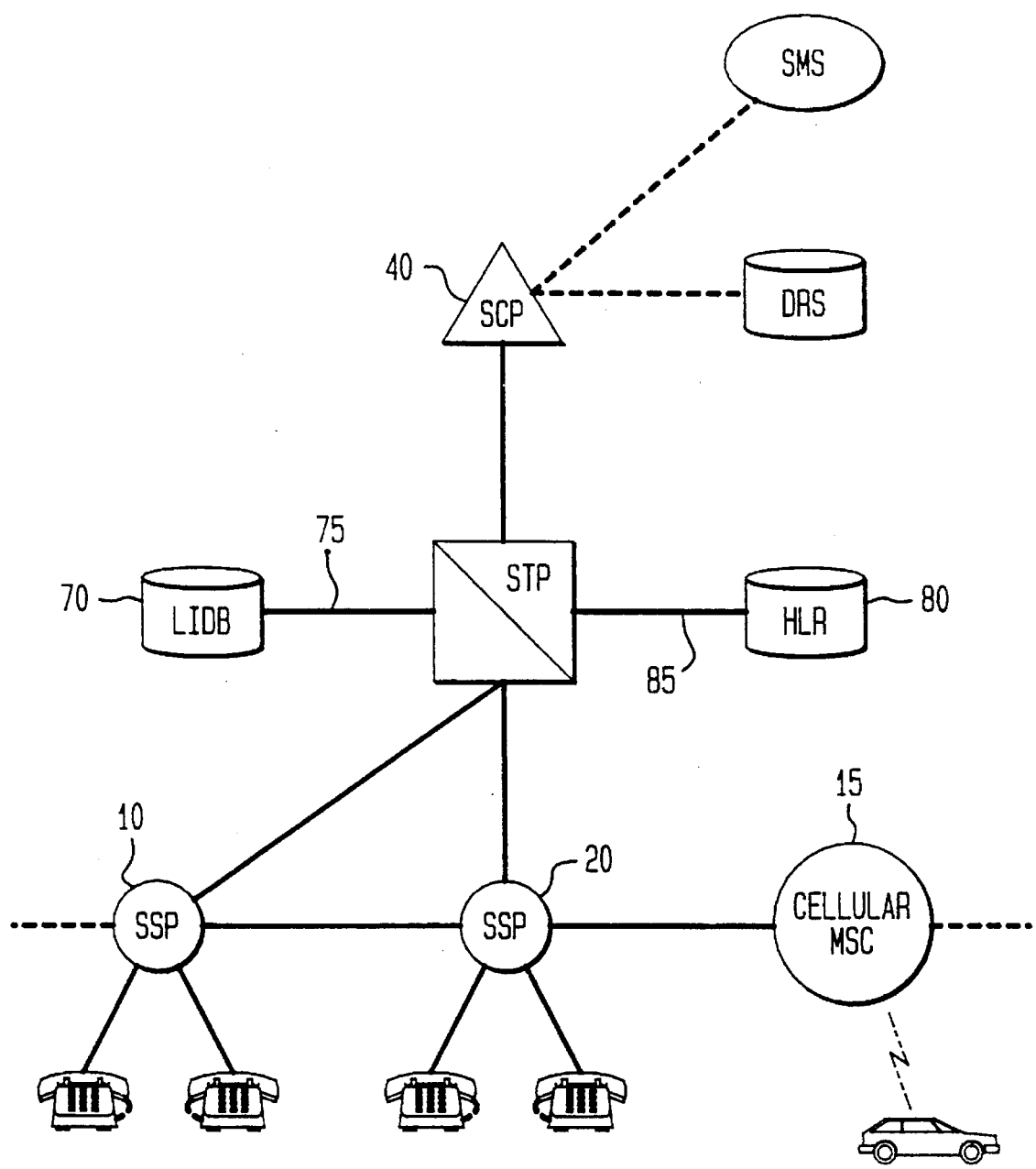
FIG. 1B is a block diagram of the AIN with connections to an HLR and LIDB.
Figure 2:
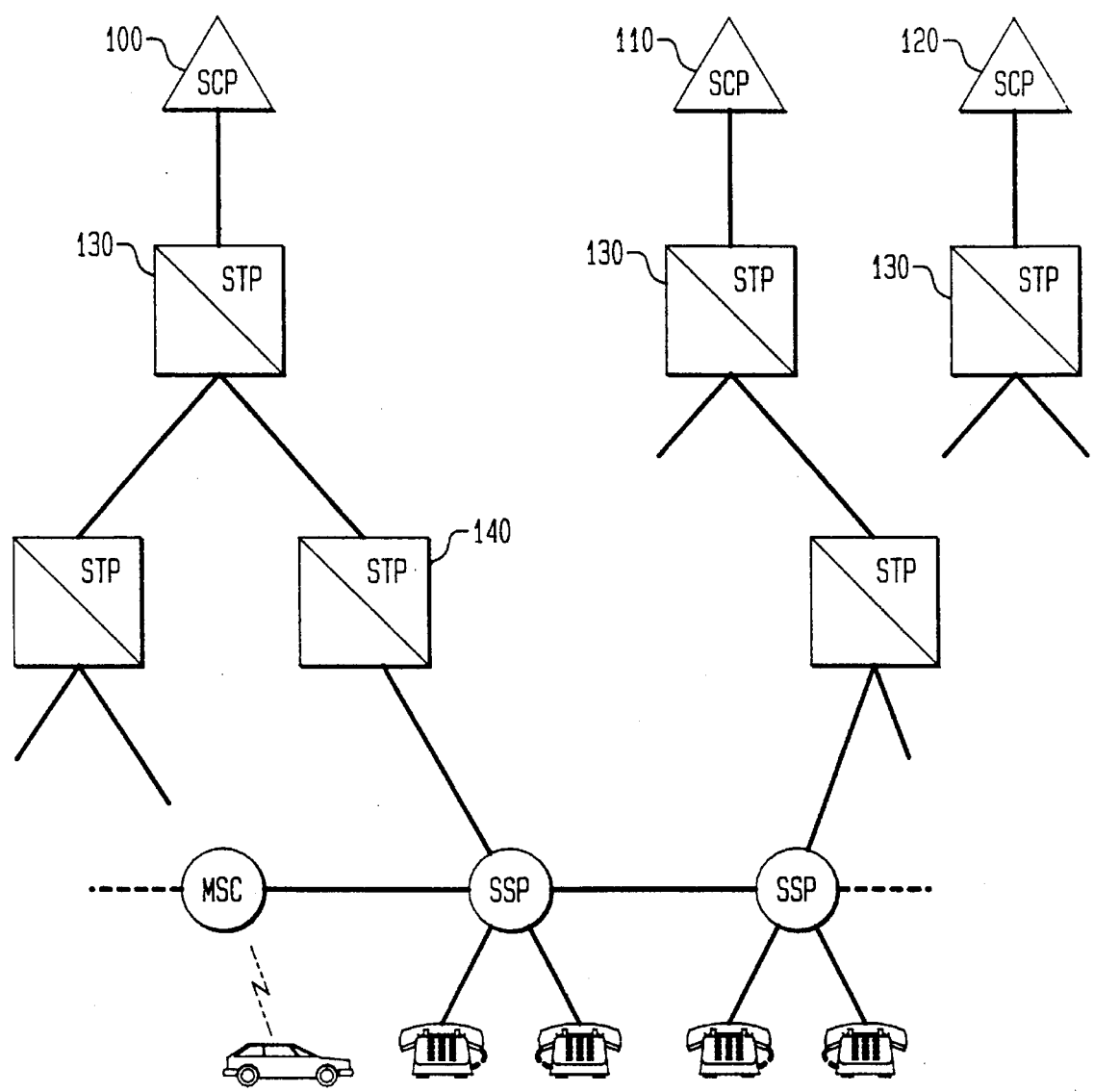
FIG. 2 is an expanded block diagram of the AIN.
Figure 3:
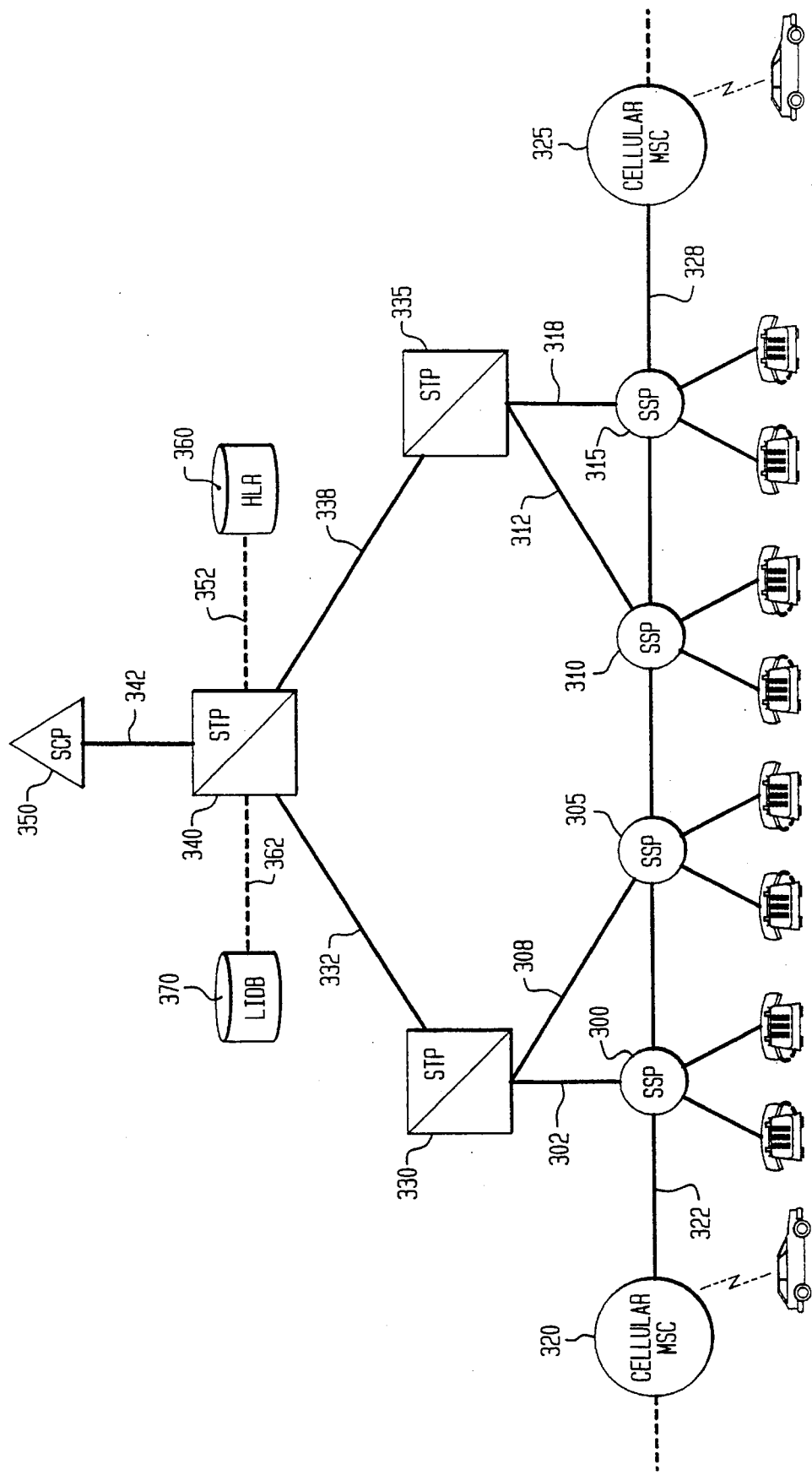
FIG. 3 is a block diagram of the AIN illustrating one embodiment of the present invention.

FIG. 3 illustrates a preferred implementation of the present invention. In the network, SSPs 300 and 305 communicate with STP 330 via CCS links 302 and 308, respectively. Similarly, CCS communication links 312 and 318 connect the SSPs 310 and 315, respectively, to the STP 335. Cellular MSCs 320 and 325 are also linked to SSPs 300 and 315, respectively, through network links 322 and 328.

STPs 330 and 335 are in turn networked to STP 340 by links 332 and 338, respectively. STP 340 communicates with SCP 350 via link 342, HLR 360 via IS-41 link 352, and LIDB 370 via link 362.

Messages transmitted between the SSPs and the SCP are formatted in accordance with the Transaction Capabilities Applications Protocol (TCAP). TCAP provides standardized formats for various query and response messages. Each query or response message includes data fields containing several pieces of information relating to the particular call. An initial TCAP query from an SSP includes, among other data, digits representing the called party address. A typical TCAP message response format may include routing information, such as the primary carrier ID code (CIC), alternate CIC, a routing number, and a destination number.

To trigger queries employing the TCAP message protocol, an SSP must be programmed to recognize certain called numbers as AIN-type calls. In accordance with the present invention, SSP 305 in FIG. 3 is preferably programmed to recognize 500 numbers as an AIN-type call. In response to such a dialed 500 number (causing what is known as a call destination-type trigger or a 3/6/10 digit trigger), the central office SSP 305 would communicate with SCP 350 via STPs 330 and 340. This communication takes the form of a query sent to SCP 350 and causes SSP 305 to suspend call processing. The TCAP format query includes the dialing number and the 500 number.

On the basis of this query, MSAP, residing on SCP 350, initiates an appropriate CPR for responding to a 500 number query. Included within that CPR is a GetData request, which is preferably handled by the GetData Interface (GDI) within MSAP within the SCP as disclosed in the incorporated patent applications. Through the GDI a request for information relating to the dialed 500 number is sent to LIDB 370.

The advantage of accessing LIDB for service provider and routing information lies in the ease and speed with which LIDB can be updated with new information, in contrast with data stored locally on SCPs, and the relatively broad access available to LIDB for providing those updates. Service provider information for a particular 500 number can be changed without having to update individual SCPs. Thus service provider identification and routing information is removed from the network of SCPs and centralized in the network, allowing uniform, independent operation of the network.

The data retrieved from LIDB 370 may include, among other things, the identification of the service provider associated with the dialed 500 number, the Global Title Translation (GTT) address of the HLR 360, or a routing number for that subscriber.

Based on the received data, the SCP then may create a TCAP response message. The TCAP response message may include, for example, the routing number associated with the dialed 500 number. The message is sent back to the originating SSP 305 through the STPs 340 and 330. The SSP 305 uses this routing data to route the call to the appropriate destination SSP and associated subscriber using techniques well known in the art. The dialed 500 number can be retained in the call context to allow additional AIN triggering at the termination SSP in the service provider's network. This additional triggering allows the service provider the opportunity for separate service applications. Where the 500 number call originates from a cellular subscriber, the MSC hands the call off to an associated SSP, which performs the triggering operations discussed above.

Figure 4:
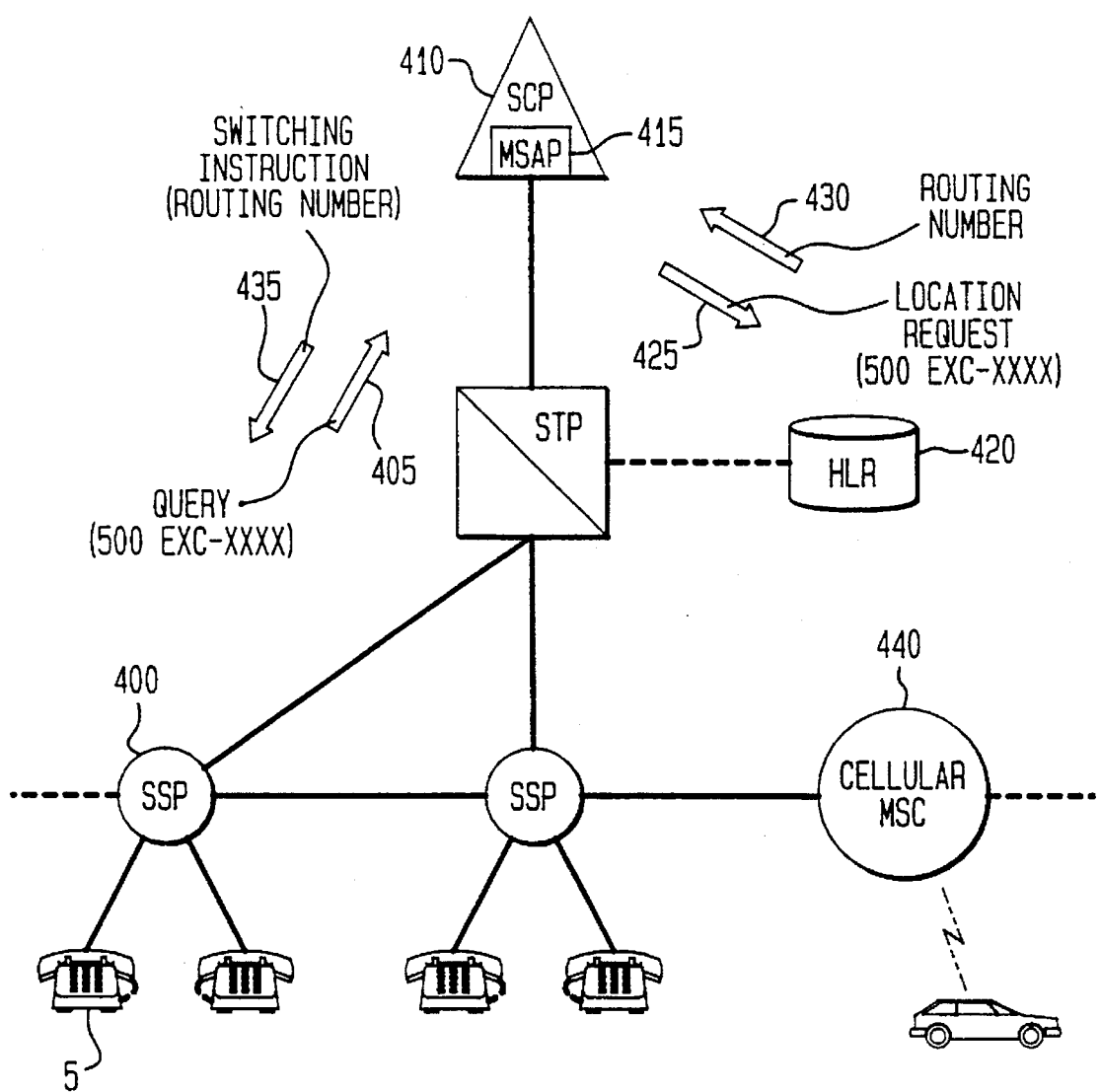
FIG. 4 is a block diagram illustrating data flow in the AIN in accordance with an embodiment of the present invention.

In another embodiment of the present invention, when a call is intended for a cellular subscriber, such as a subscriber at MSC 325 shown in FIG. 3, the SCP 350 must make an IS-41 format query of an appropriate HLR to determine the location of the subscriber. Thus the GetData request to LIDB for such a call returns the GTT address of an HLR, and a query of the HLR at the GTT address is performed by MSAP. FIG. 4 illustrates this operation.

As shown in FIG. 4, a 500 number call from telephone 5 results in a triggered query 405 from SSP 400 to SCP 410. MSAP 415, residing on SCP 410, implements a CPR invoking a request of the LIDB (not shown) to match the dialed exchange of the 500 number to, for example, a GTT address for an HLR. The data may also include a preferred service provider protocol, such as IS-41 for communications with the HLR.

SCP 410 then sends the HLR 420 a location request 425, including the dialed 500 number, under any specified protocol. As is further shown in FIG. 4, HLR 420 responds to the location request with a routing number response 430 corresponding to the service provider associated with the dialed 500 number. In turn, SCP 410 sends a switching instruction 435, including the routing number identified by HLR 420, to SSP 400. Finally, SSP 400 routes the call in accordance with the received routing number to the service provider 440.

Figure 5:
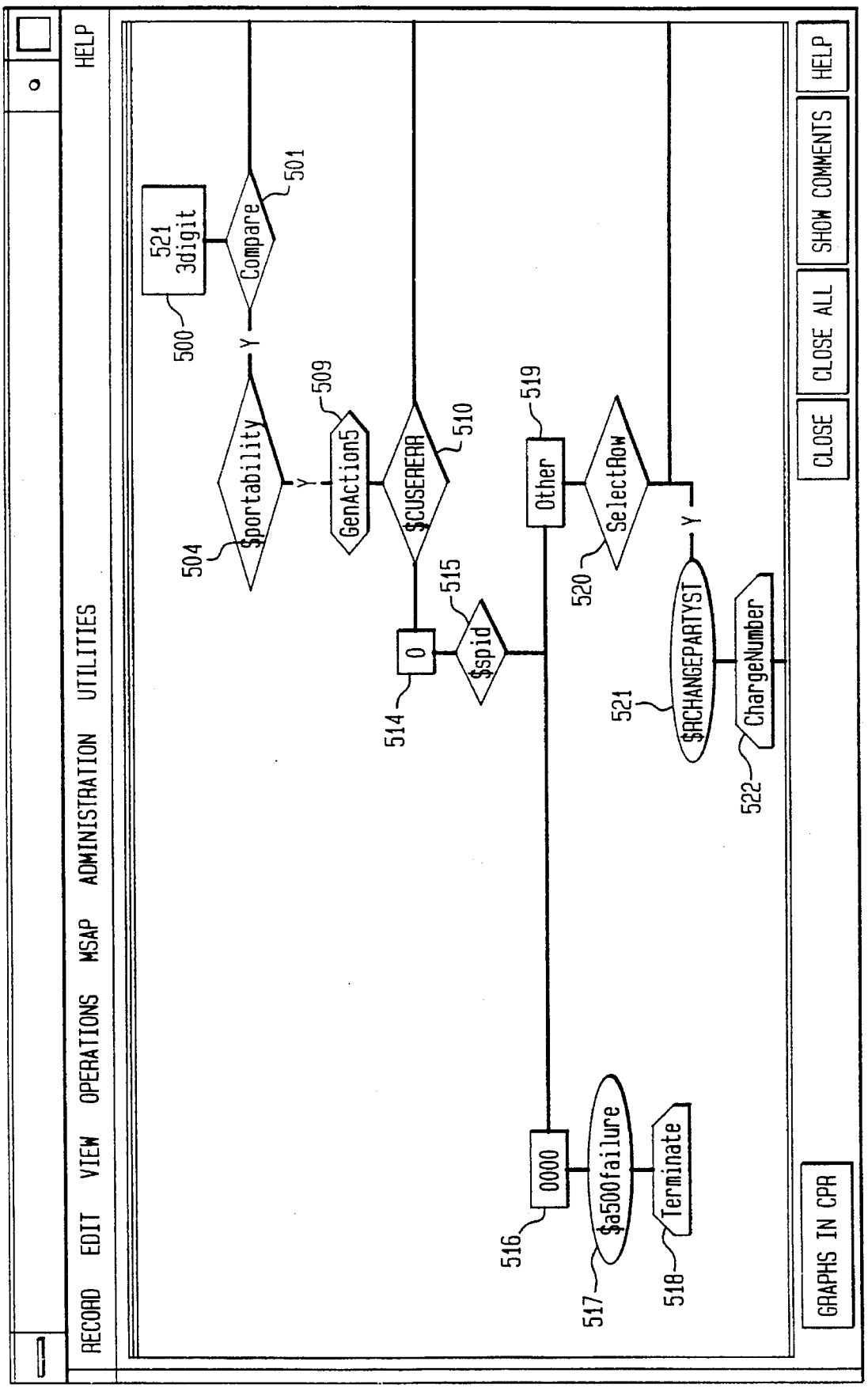
FIGS. 5–9 are computer screen print-outs of a call processing record implementing the main processing flow of the preferred embodiment of the present invention.

An example of a CPR implementing the 500 number service of the present invention begins with the depiction in FIG. 5. The incorporated patents and applications describe in detail the creation, execution, and implementation of CPRs. FIGS. 5–12, described below, are computer screen print-outs of particular portions of a complete CPR.

Node 500 designates the start of the depicted CPR, and is invoked by the 3, 6, or 10 digits of an AIN trigger. The initial processing decision 501 determines whether the dialed 500 number contains the correct number of digits, preferably 10 digits. If the dialed number does not contain 10 digits, processing is terminated through nodes 502 and 503 of FIG. 6, which assign an error code and perform error treatment, respectively. Referring again to FIG. 5, if the correct number of digits have been received, decision node 504 determines whether the portability function-allowing access to outside information within LIDB-is activated. If portability according to the present invention is not activated, processing proceeds to decision node 505 in FIG. 6, which locates any service provider information in a local look-up table within MSAP. If no such information exists, processing continues through nodes 507 and 508 which assign an error code and perform error treatment, respectively. If local service provider information is present, processing continues to jump node 506 and then directly to node 521, continuing as described below.

If portability is activated in accordance with the present invention, however, a GetData-type TCAP request to the LIDB is executed in node 509 of FIG. 5. As discussed above, the LIDB contains at least the service provider ID, possibly the GTT address for a location register, and CIC routing numbers, all associated with the dialed 500 number.

Figure 6:
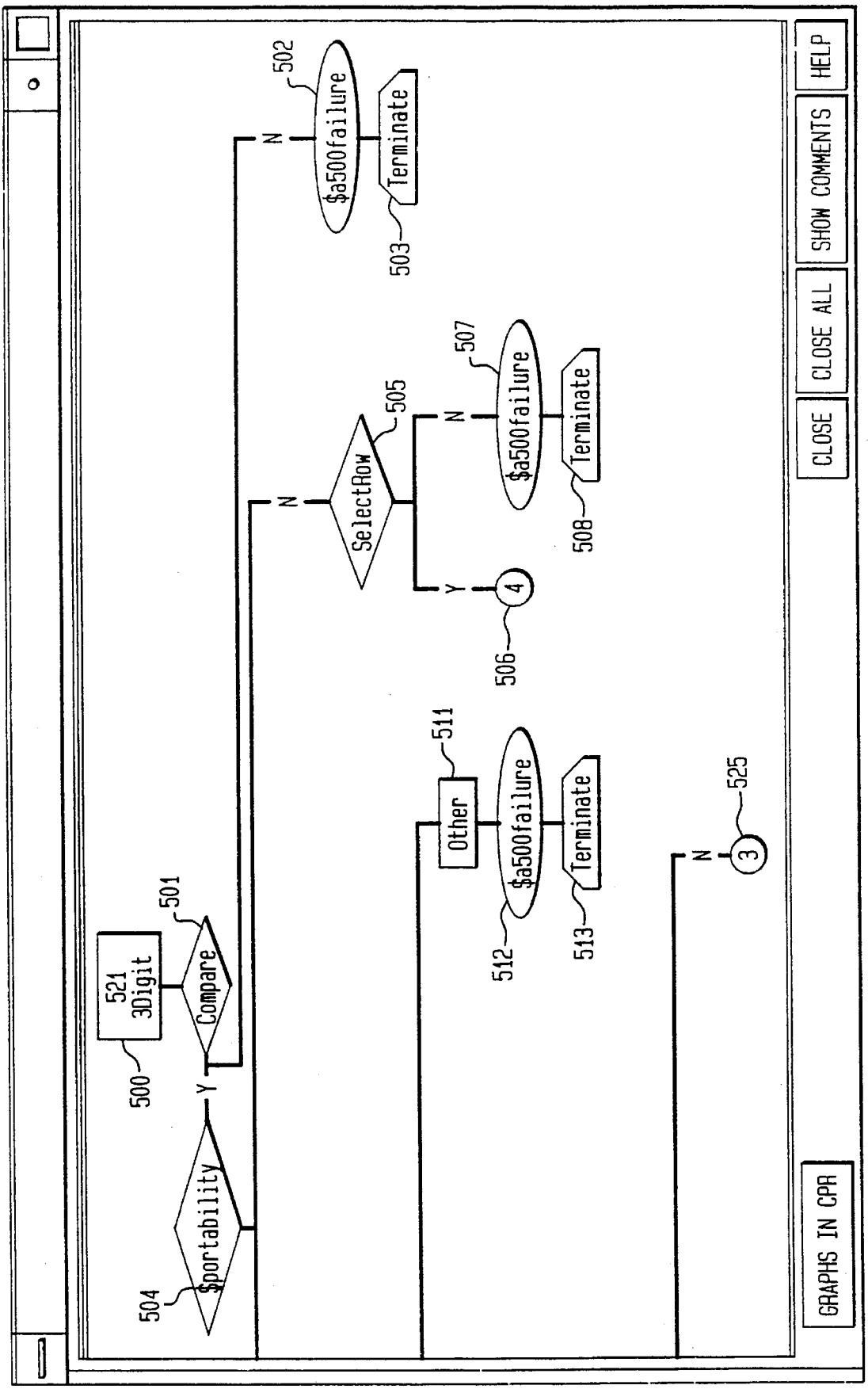

If an error results from the GetData-type TCAP request, decision node 510 detects the error and processing is directed through node 511 to nodes 512 and 513 of FIG. 6. Nodes 512 and 513 assign an error code and perform error treatment, respectively.

If the GetData-type TCAP request is successful, indicated by decision node 514 in FIG. 5, processing continues to decision node 515 which determines whether a service provider ID corresponding to the dialed 500 number has been identified in the requested information. If no service provider is identified, processing continues to decision node 516, and nodes 517 and 518 assign an error code and perform error treatment, respectively.

During normal processing, however, a service provider will be identified and processing will flow through "other" branch 519 to decision node 520. Decision node 520 determines whether a "local overwrite" is required. Depending on the business arrangements between service providers, particular service providers may contract to use private trunk groups. Local overwrites specify whether private trunk groups are to be employed regardless of the data stored on LIDB and retrieved in the GetData-type TCAP request. Where no local overwrite is required, processing jumps from jump node 525 in FIG. 6 directly to decision node 550 in FIG. 7, described below.

Figure 7:
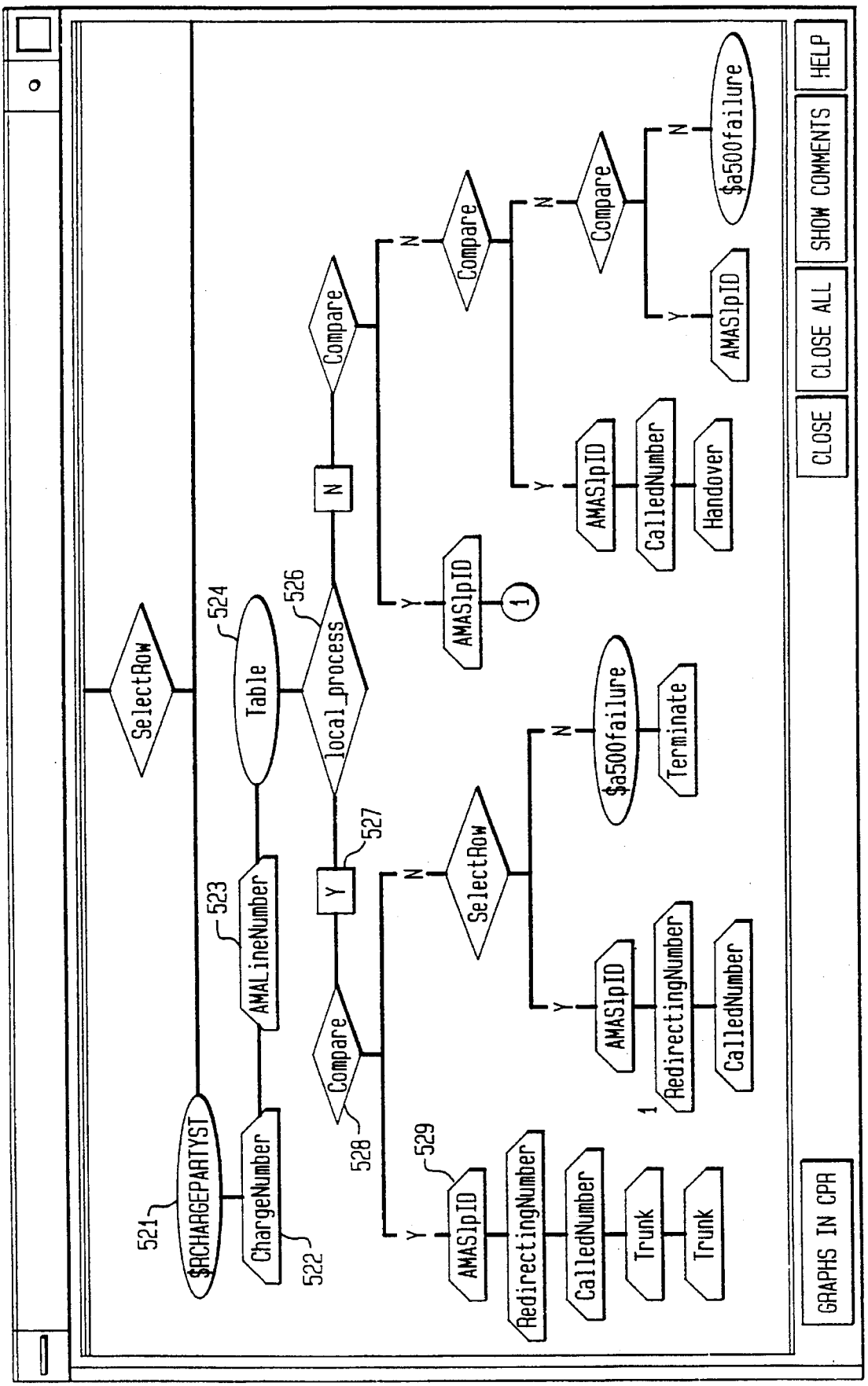
Figure 8:
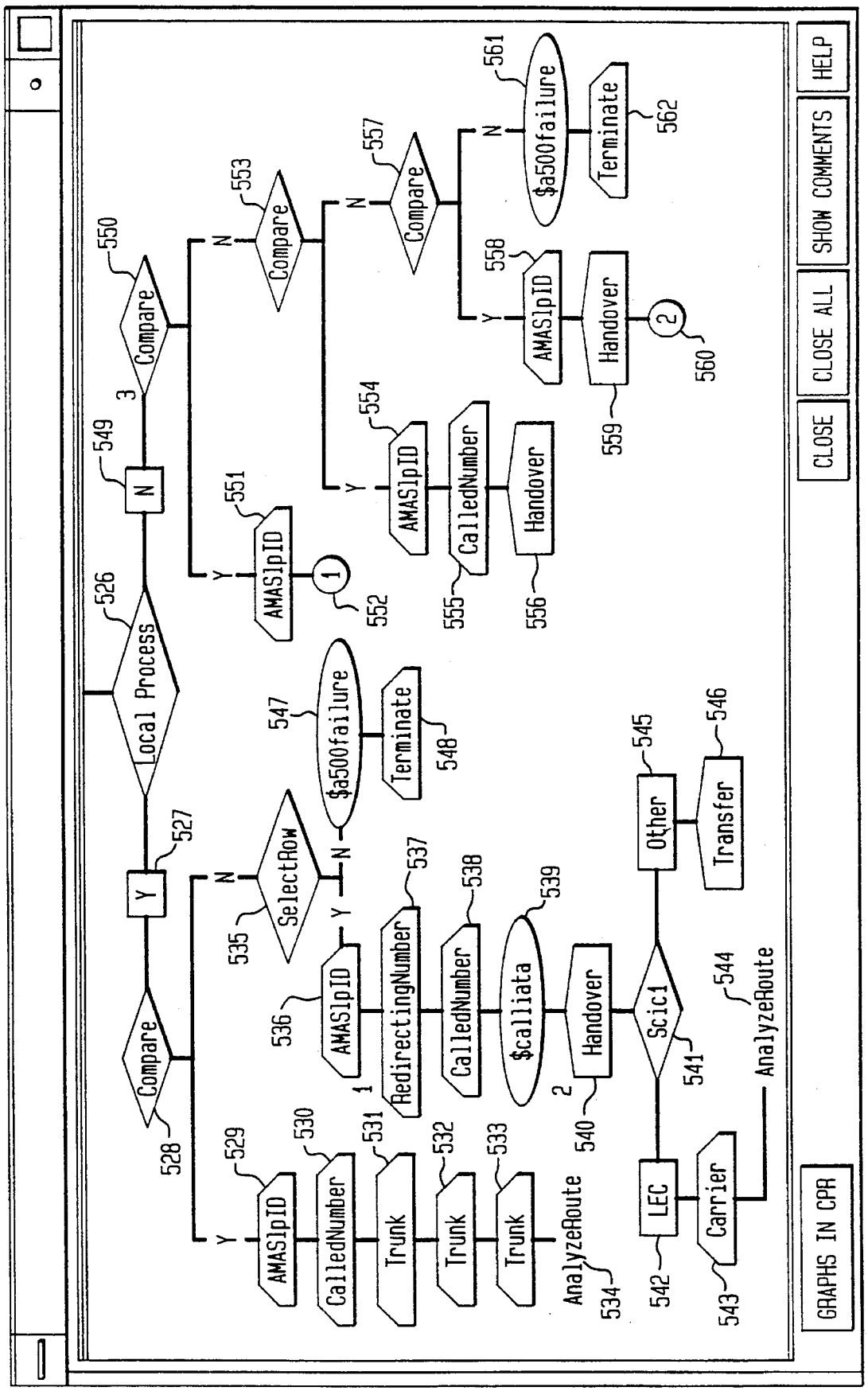

If a local overwrite is required, that data is accounted for through nodes 521–524 shown in FIGS. 5 and 7. Node 521 sets the appropriate charge party ID in an AIN-type TCAP message field. Node 522 then sets the appropriate charge number in another field of the AIN-type TCAP message. Node 523 completes the billing information in the AIN-type TCAP message field. Finally, node 524 determines whether the local overwrite information—such as a trunk group ID for local overwrite under portability, or the translation table providing a routing number for non-portability service—is present.

Decision node 526 in FIG. 7 then determines whether the data retrieved through the GetData-type TCAP request identifies a local service provider. If a local service provider is indicated, processing proceeds through "YES" branch 527 to decision node 528. Decision node 528 determines whether the local information identifies a trunk group, rather than a translation table. If a trunk group is identified, indicating that the 500 number translation can be performed by the current ISCP, processing continues to node 529, shown in FIG. 8, where the appropriate billing information indicating this type of call handling is set in the AIN-type TCAP message. Node 530 assigns the dialed 500 number to an AIN-type TCAP field. Nodes 531–533 set the first, second, and third alternate trunk IDs, respectively, in the appropriate fields of the AIN-type TCAP message. Finally, the AnalyzeRoute AIN-type TCAP message is sent out at node 534. Depending on the business arrangement between service providers, the dialed 500 number or a translated number acquired from the requested data may be out-pulsed through the designated trunk group.

Where the local information constitutes a translation table providing a routing number, processing proceeds from node 528 to node 535, beginning the Subscriber Translation Feature discussed above. Node 535 locates the translated routing number for the dialed 500 number. If no error occurs in the number translation look-up, processing continues to node 536 which sets the appropriate billing information in the AIN-type TCAP message to indicate the particular calling procedures invoked. Node 537 assigns the routing number to an appropriate AIN-type TCAP message field, and node 538 assigns the dialed 500 number to a similar AIN-type TCAP message field. Node 539 assigns Local Access Telephone Area (LATA) information to a call variable for intra-LATA call checking purposes. The LATA information determines whether the call must be handed off to a long-distance carrier, or whether the local system will be able to route the call. An intra-LATA call is a local call. Node 540 then invokes the CPR depicted in FIG. 9 to determine whether the dialed 500 number call is an intra-LATA call and can be handled by the local system.

Figure 9:
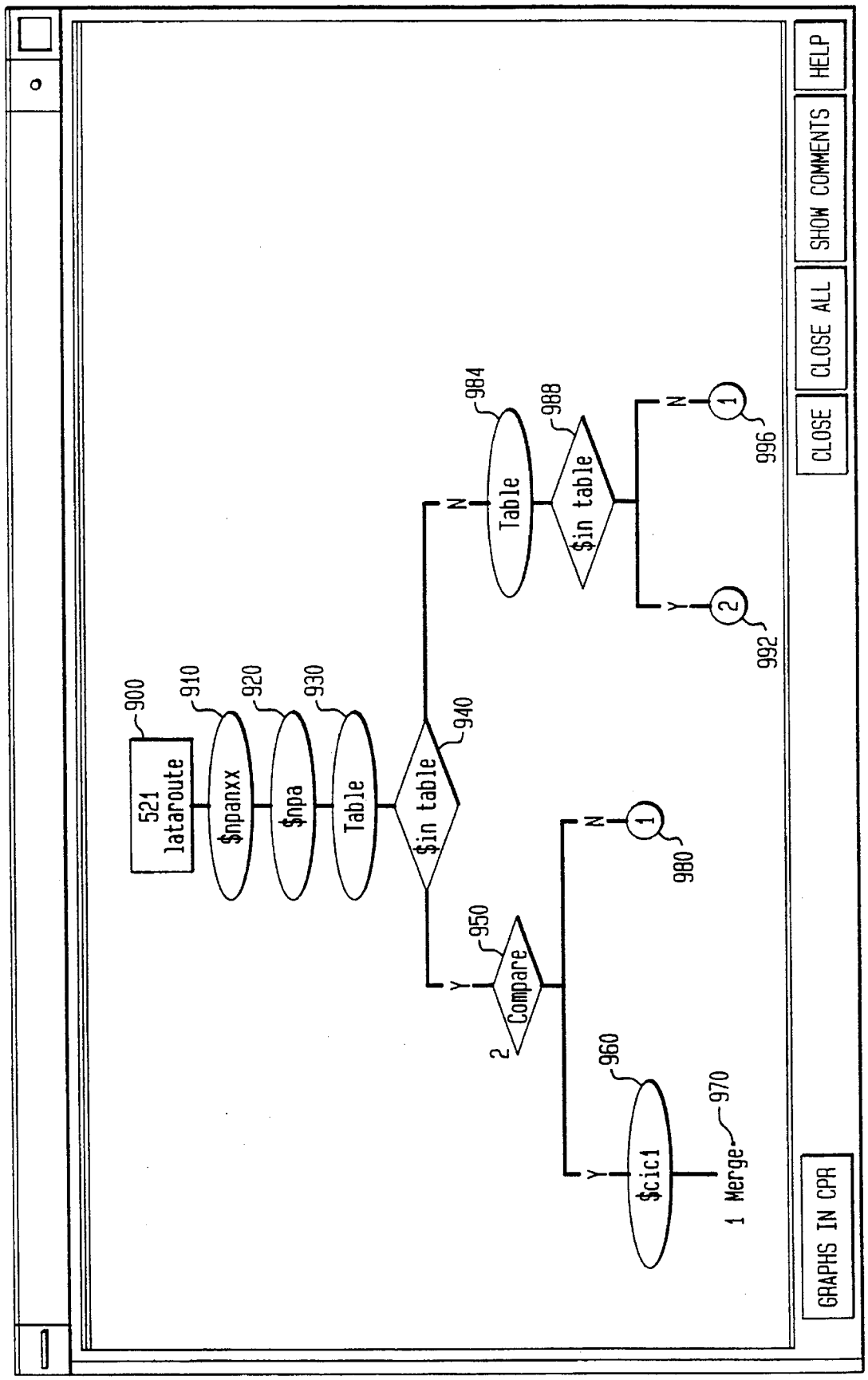

Referring to FIG. 9, following entry node 900, node 910 assigns the area code and exchange of the routing number to a call variable for a later table search. Similarly, node 920 assigns the area code of the routing number to a call variable. Node 930 performs a look-up of the LATA information from a local look-up table using the first call variable. If the LATA information is determined, decision node 940 routes processing to decision node 950 which determines whether the call is an intra-LATA call. If so, processing continues to node 960, which assigns the call variable CIC1 the value of "LEC" as an indication that the call is an intra-LATA call. Processing is then returned to the CPR depicted in FIG. 7 through invocation of the merge node 970.

If at node 950 it is determined that the call is a long-distance call, however, processing jumps from jump node 980 directly to merge node 970. Note that the call variable CIC1 is thus not assigned a value of "LEC."

If the LATA information is not found using the area code and exchange call variable assigned in node 910, processing flows from node 940 to node 984 which attempts to locate the LATA information from a table using the area code call variable set in node 920. If the LATA information is found, decision node 988 directs processing to jump node 992, which in turn directs processing to node 950 as described above. If the LATA information is not found, decision node 988 directs processing through jump node 996 directly to merge node 970.

Referring again to FIG. 8, processing returns to node 541 which determines whether the call variable CIC1 is assigned a value of "LEC." If so, processing continues through node 542 to node 543, which assigns "LEC" to an AIN-type TCAP message field indicating that the call is to be processed by the SSP as a local call. Node 544 then sends out the AnalyzeRoute message to the SSP to route the call. If the call variable CIC1 is not assigned the value "LEC," processing flows through node 545 to node 546 which transfers processing to the CPR in FIG. 10.

Figure 10:
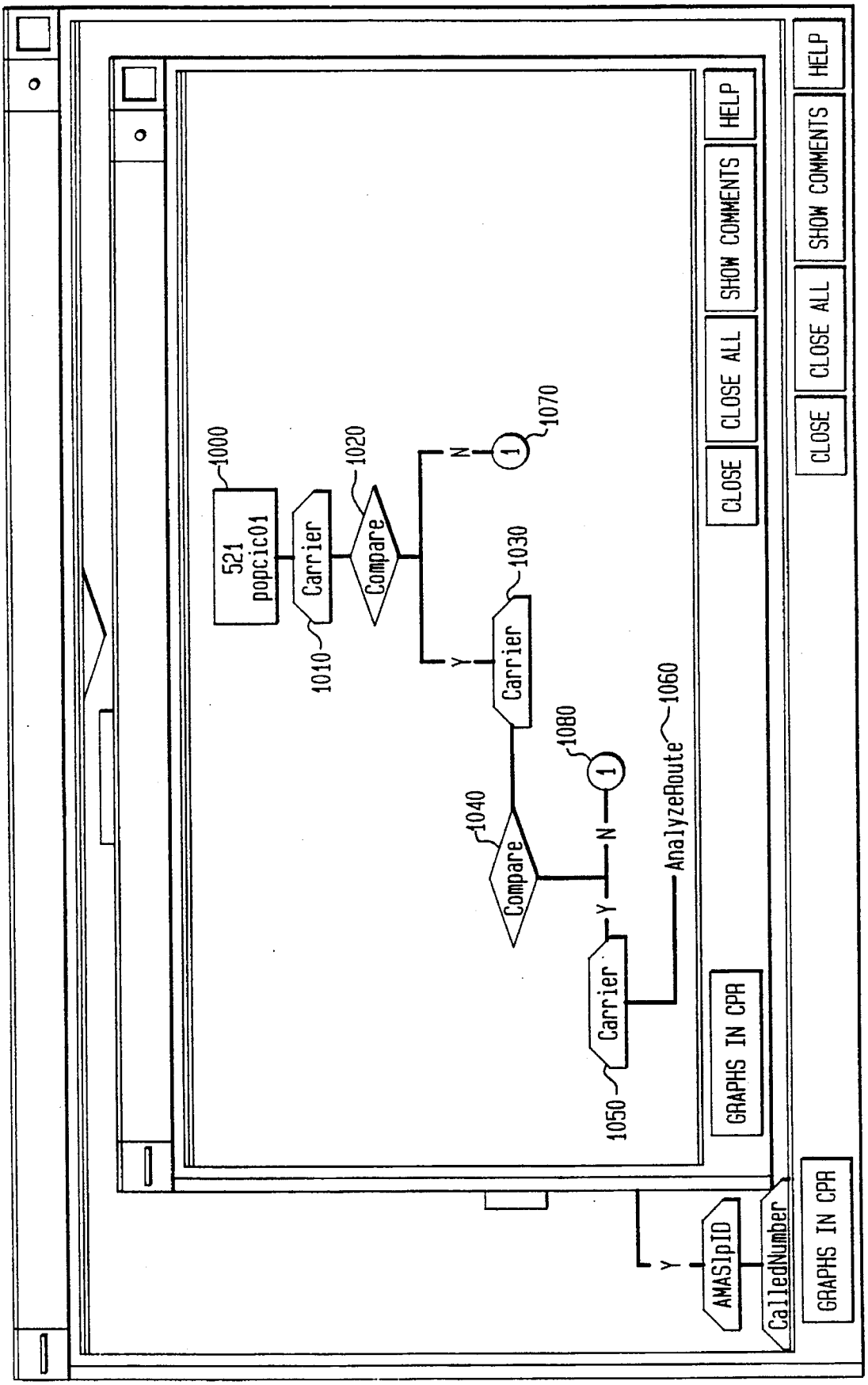
Figure 11:
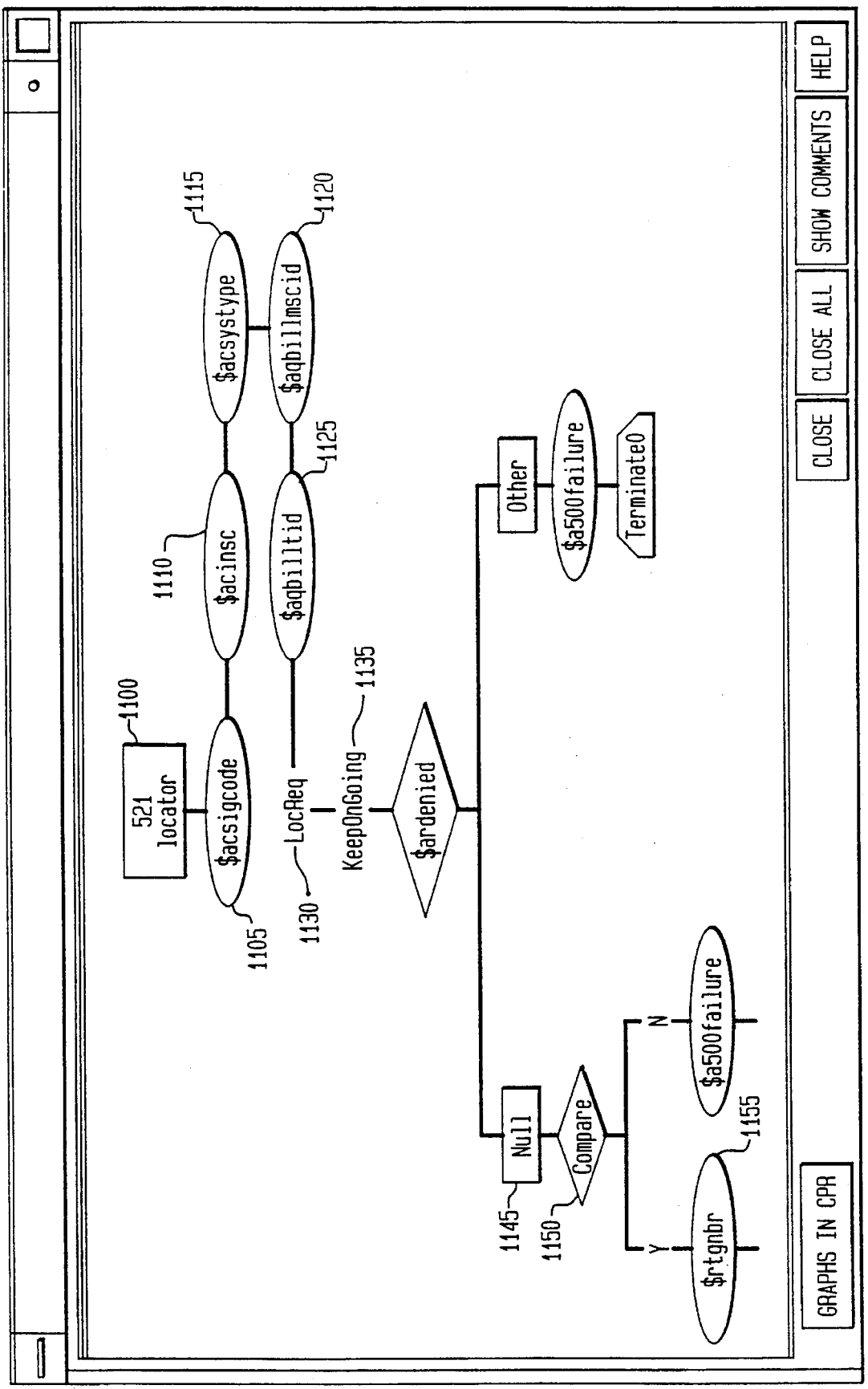

The CPR in FIG. 10 sets CIC codes in the AIN-type TCAP primary, alternate, and second alternate carrier fields. After entering the CPR through node 1000, processing continues to node 1010 which sets the primary carrier information with CIC1. Node 1020 determines whether the CIC2 code is of the correct format. If so, node 1030 sets the alternate carrier information which CIC1. Node 1040, in turn, determines whether the CIC3 code is of the correct format. If the correct format is found, node 1050 sets the second alternate carrier information with the CIC1 code, and the AnalyzeRoute AIN-type TCAP message is sent out via node 1060. If the CIC2 or CIC3 code is of improper format, jump nodes 1070 or 1080 channel processing directly to node 1060.

Referring again to FIG. 8, if the translated routing number for the dialed 500 number is not within the translation table provided within the local information, processing flows from node 535 to nodes 547 and 548, which set an appropriate error code and perform error treatment, respectively.

If the SCP cannot perform the local processing discussed above, processing flows from decision node 526 through node 549 to node 550. Node 550 determines whether the designated routing number for a particular service provider has been set. If so, processing continues to node 551 where the appropriate billing information is set in an AIN-type TCAP field to indicate the call processing route taken. Processing then continues from jump node 552 to node 537, and the call is processed as discussed above.

Where no service provider routing number is specified, processing flows from node 550 to node 553 which determines whether the CIC code is set. If the CIC code is set, processing flows to node 554 which sets the billing information within the AIN-type TCAP message to indicate the call processing path taken. Node 555 sets the dialed 500 number in the AIN-type TCAP message field. Finally, node 556 transfers processing to the CPR depicted in FIG. 10. The CPR shown in FIG. 10 continues processing as discussed above, ultimately sending out the AnalyzeRoute AIN-type TCAP message.

If the CIC code is not set, processing flows from node 553 to node 557, which determines whether the GTT address of the location register is present. If the address is detected, processing flows to node 558 which sets the appropriate billing information indicating the processing path taken. Node 559 then transfers processing to the CPR depicted in FIG. 11 to perform a location request to the addressed location register.

After entering the CPR at node 1100, node 1105 assigns the GTT address to the location request message. Node 1110 assigns the Mobil Switching Center (MSC) ID to the message, and node 1115 assigns a value indicating the particular ISCP type. Finally, nodes 1120 and 1125 assign billing type and billing ID information, respectively, to the location request message. Node 1130 actually sends out the IS-41-type TCAP message, such as the location request message. Upon receipt of the response, processing resumes from suspension through node 1135, and node 1140 determines whether the location register has honored the location request message.

If the request has been honored, processing flows through node 1145 to node 1150, which determines whether the returned routing number is of proper length. If the return routing number is of correct length, node 1155 shown in FIG. 12 assigns the routing number to an internal call variable for further processing. Node 1160 returns processing to the CPR depicted in FIG. 8. Processing then jumps from jump node 560 to node 540, and continues as described above.

Referring again to FIG. 12, if the location register failed to honor the location request message, or if the returned routing number was of improper length, nodes 1165–1175 or 1180–1185 assign an error code and perform error treatment.

Finally, referring again to FIG. 8, if the GTT address of the location register is not present, nodes 561 and 562 set an error code and perform error treatment, respectively.

While what is at present considered to be preferred implementations and methods of the present invention have been illustrated and described above, it will be understood by those skilled in the art that various changes and modifications may be made, and equivalents may be substituted for elements thereof without departing from the true scope of the invention.

In addition, many modifications may be made to adapt a particular element, technique, or implementation to the teachings of the present invention without departing from the central scope of the invention. Therefore, it is intended that this invention not be limited to the particular embodiments or methods disclosed herein, but that the invention include all embodiments falling within the scope of the appended claims.

What is claimed is:

1. A method of controlling a telephone switching network including a control processor connected to a storage device for storing data, an originating switching system, a destination switching system, a home location register at a Global Title Translation address, and a plurality of telephones in communication with the originating and destination switching systems, each telephone having a corresponding telephone number and capable of calling a called telephone number, the called telephone number being a geographically independent number, the method comprising the steps, executed by the control processor, of:

receiving from the originating switching system a switching query including a called number;

sending to the storage device a data query including the called number;

receiving from the storage device a data response, including at least an identification of the destination switching system, the Global Title Translation address of the home location register, or a routing number associated with the called number; and sending to the originating switching system a switching response, including the identification of a destination switching system or the routing number associated with the called number.

2. The method of claim 1, wherein the data response is the Global Title Translation address of the home location register, including the substep of:

sending the home location register at the Global Title Translation address a location request, and receiving from the location register a location response including a routing number.

3. The method of claim 1, wherein the called number includes a 500 service access code.

4. The method of claim 2, wherein the switching query and switching response are communicated according to a first communications protocol, the data query and data response are communicated according to a second communications protocol, and the location request and location response are communicated according to a third communications protocol.

5. The method of claim 4, wherein the called number includes a 500 number area code.

6. The method of claim 4, wherein the first communications protocol is AIN-type TCAP message protocol.

7. A method of controlling a telephone switching network including a control processor connected to a storage device for storing data, an originating switching system, a home location register of a Global Title Translation address, a plurality of destination switching systems, and a plurality of telephones in communication with the originating and destination switching systems, each telephone having a corresponding telephone number and capable of calling a called telephone number having an area code, an exchange, and a local number, the called telephone number being a geographically independent number, the method comprising the steps, executed by the control processor, of:

receiving from the originating switching system a switching query, including an exchange and a local number of a called number;

identifying a home location register associated the called number by comparing the called number with the data stored in the storage device;

sending to the home location register associated with the called number a location request, including the exchange and the local number of the called number;

receiving from the home location register associated with the called number a routing response, including a location number associated with the called number; and sending to the originating switching system a switching response, including the routing number associated with the called number.

8. The method of claim 7, wherein the called number includes a 500 service access code.

9. The method of claim 7, wherein the switching query and switching response is communicated according to a first communications protocol, and the location request and location response is communicated according to a second communications protocol.

10. The method of claim 9, wherein the called number includes a 500 service access code.

11. The method of claim 9, wherein the second communications protocol is IS-41-type TCAP communications protocol.

12. A system for controlling a telephone switching network including a control processor connected to a storage device for storing data, an originating switching system, a home location register at a Global Title Translation address, a plurality of destination switching systems, and a plurality of telephones in communication with the originating and destination switching systems, each telephone having a corresponding telephone number and capable of calling a called telephone number, the called telephone number being a geographically independent number, the system comprising:

means for receiving from the originating switching system, a switching query including a called number;

means for sending to the storage device, a data query including the called number;

means for receiving from the storage device a data response, including at least an identification of a destination switching system, the Global Title Translation address of the home location register, or a routing number associated with the called number; and means for sending to the originating switching system a switching response, including the identification of a destination switching system or the routing number associated with the called number.

13. The system of claim 12, wherein the called number includes a 500 service access code.

* * * * *